Patented June 17, 1930

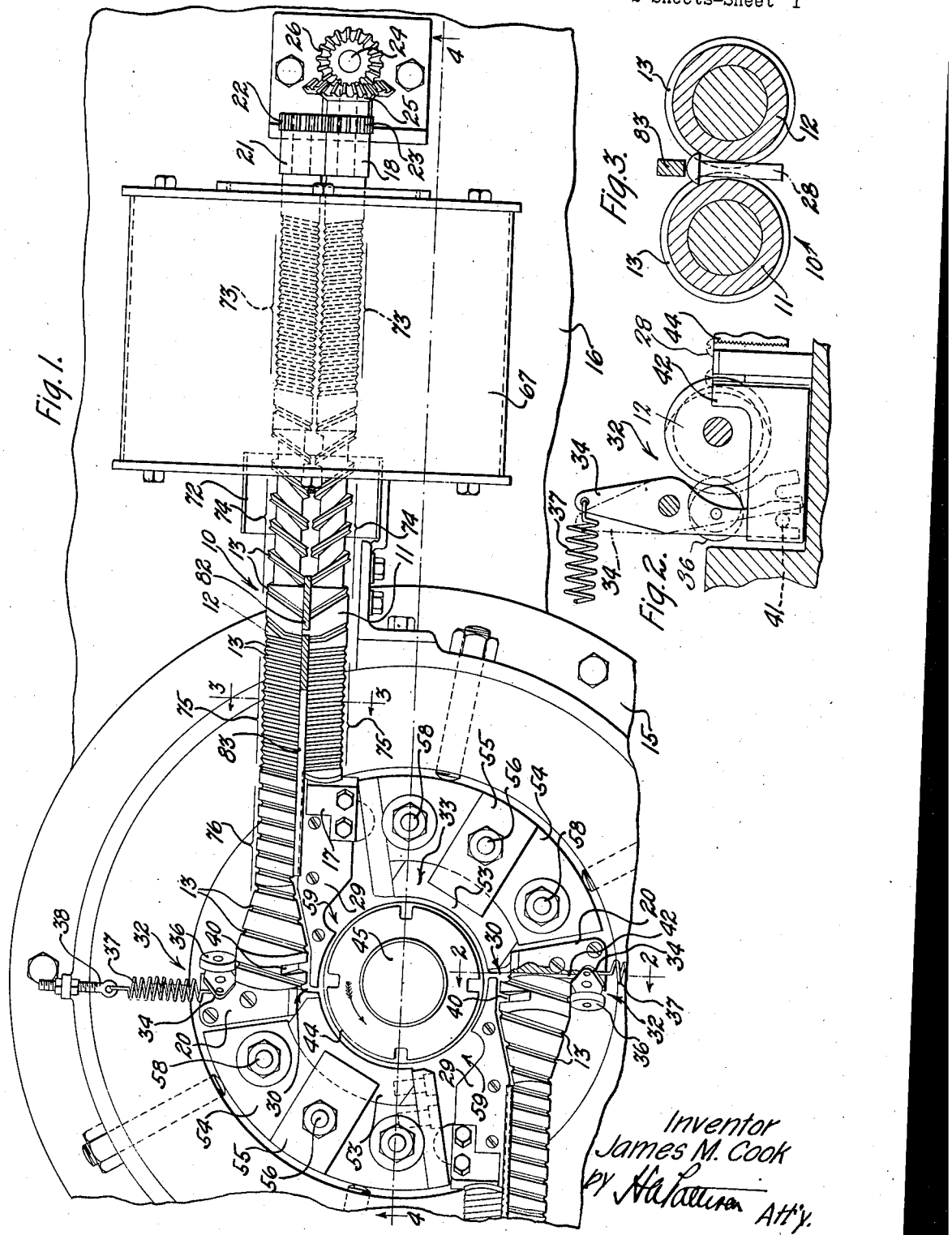

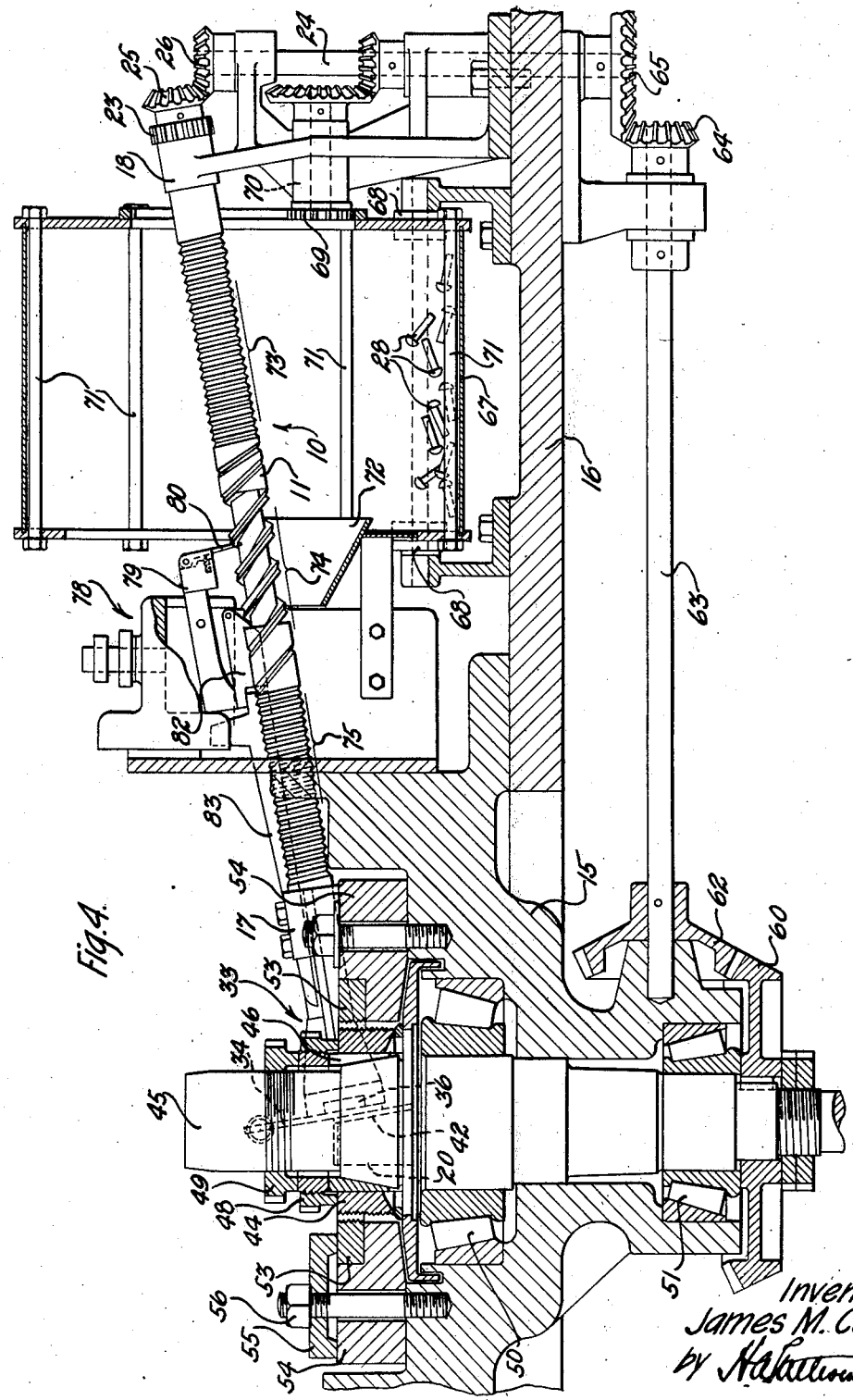

1,764,607

UNITED STATES PATENT OFFICE

JAMES MILTON COOK, OF LA GRANGE, ILLINOIS, ASSIGNOR TO WESTERN ELECTRIC COMPANY, INCORPORATED, OF NEW YORK, N. Y., A CORPORATION OF NEW YORK

SCREW-THREADING APPARATUS

Application filed June 8, 1927. Serial No. 197,258.

This invention relates to material working apparatus, and more particularly to means for feeding screw blanks to a rotary threader.

The primary object of this invention is to provide a simple, compact and highly efficient apparatus for expediting the working of blanks.

In accordance with the general features of the invention, one embodiment thereof constituting a screw blank threading apparatus includes a screw mechanism provided with spiral ways for receiving screw blanks deposited thereon in indiscriminate order from a rotary hopper. Blanks properly positioned within the ways are advanced to a storage portion thereof and improperly positioned blanks are ejected. From the storage portion the blanks are advanced in predetermined spaced relation to a rotary threader and individual blanks are forced into the threader by a cam actuated slide controlled by the screw mechanism.

These and other objects will be more apparent from the following detailed description and the accompanying drawing, wherein Fig. 1 is a fragmentary plan view of a screw threading apparatus representing one embodiment of the invention, the stop mechanism being removed therefrom;

Fig. 2 is a detailed sectional view taken on the line 2—2 of Fig. 1 disclosing the elements constituting the transfer mechanism;

Fig. 3 is a transverse section of the screw mechanism taken on the line 3—3 of Fig. 1 disclosing a screw blank properly positioned within the spiral way, and Fig. 4 is a vertical sectional view taken on the line 4—4 of Fig. 1, the rotary hopper being shown in section to more clearly illustrate the parts otherwise hidden.

Referring now to the drawings wherein like numerals have been employed to designate similar parts throughout the various figures, it will be observed that a screw mechanism or conveyor denoted generally by the numeral 10 comprising a pair of parallel screws 11 and 12 having continuous spiral ways 13 formed therein is positioned above machine frame portions 15 and 16. The screws 11 and 12 are inclined from the horizontal, the screw 11 being journaled between suitable bearings 17 and 18 while the screw 12 is journaled between bearings 20 and 21. The upper extremity of the screw 12 supports a gear 22 which meshes with a companion gear 23 carried by the screw 11 and the screw 11 is connected with a vertical drive shaft 24 by means of bevel gears 25 and 26. It is to be understood that when a screw blank 28 is properly positioned between companion portions of the spiral ways 13 of the screw mechanism 10 as clearly shown in Fig. 3, such a blank will be advanced upon the rotation of the screws 11 and 12 and when the advanced screw blank reaches the lower end of the screw 11, it will be advanced into position between a guide plate 29 (Fig. 1) and the lower portion of the screw 12. The lower extremity of the screw 12 is enlarged and the spiral way 13 therein cooperating with the guide plate 29 operates to convey or feed the blank into a position indicated by the numeral 30 (Figs. 1 and 2). In this position the advanced screw blank 28 may be acted upon by a transfer mechanism 32 which serves to advance the blank into association with a threading mechanism denoted generally by the numeral 33.

The transfer mechanism 32 (Figs. 1 and 2) comprises a lever 34 which is pivoted intermediately thereof to the bearing 20. Immediately beneath the pivoted portion of the lever 34 is a roller 36 which engages the peripheral surface of the lower extremity of the screw 12, contact of the roller with the peripheral surface being maintained through the action of a coil spring 37 interposed between the upper extremity of the lever 34 and a fixed eye bolt 38. A cam groove 40 provided in the screw 12 is designed to receive the roller 36 of the transfer mechanism 32 and functions to cause the reciprocation of the lever 34 upon each rotation of the screw 12. The lower extremity of the lever 34 is bifurcated to receive a pin 41 (Fig. 2) which connects the lever with a slide member 42 and from the foregoing it will be clear that upon each rotation of the screw 12 the slide 42 will experience a complete reciprocation. The forward movement of the slide 42 operates to advance the screw blank 28 which has been positioned by the screw 12 and transfer said blank to the rotary die mechanism 33. In this connection it will be observed that the forward surface of the slide 42 which engages the shank of the blank 28 is beveled so as to positively force the blank into position to be received by the threading mechanism 33, and immediately upon the return of the slide, another screw blank is fed into the position indicated by the numeral 30 to be subsequently acted upon or transferred by the slide.

The threading mechanism 33 comprises a movable or rotary die 44 which is securely mounted upon a vertical spindle 45 by means of a tapered split collar 46 (Fig. 4) and suitable clamping members 48 and 49. The spindle 45 is rotatable upon roller bearings 50 and 51, the lower extremity of the spindle 45 being connected with a suitable driving mechanism (not shown). A pair of segmental die members 53 oppositely disposed from the axis of the spindle 45 are supported within segmental holding blocks 54 and are secured in position by means of clamps 55 and associated clamping nuts 56. The segmental holding blocks 54 are rigidly secured to the machine frame 15 by means of suitable machine bolts 58 and it will be observed that the purpose for having a pair of such blocks and associated dies 53 is to accommodate the type of machine disclosed in Fig. 1 wherein two sets of screw mechanisms 11 are provided. The function of these two screw mechanisms are identical and therefore the complete structure of only one of the mechanisms has been described. From the foregoing it is to be understood that when a screw blank 28 is transferred by the action of the reciprocating slide 42 from the position 30, this blank will be gripped between the threads of the rotating die 44 and the companion fixed die 53 so as to quickly and accurately thread the blank. Upon emerging from between the dies 44 and 53 the threaded blank is deposited within an opening 59 from which point it is delivered by gravity to a suitable receiving tray (not shown). The lower end of the spindle 45 supports a gear 60 which serves to impart rotation to the vertical shaft 24 through the medium of a gear 62, a shaft 63 and bevel gears 64 and 65.

In order to continuously deliver the screw blanks to the upper portion of the screw mechanism 10, a rotary hopper 67 is provided which is rotatable upon suitable roller bearings 68. Continuous rotation is imparted to the hopper 67 by a gear 69 which is supported by a shaft 70 having a geared connection with the vertical drive shaft 24. The blanks may be directed into the hopper 67 by means of a chute 72 and cross bars 71 positioned adjacent the inner surface of the hopper casing operate to lift screw blanks within the hopper and cause the same to be deposited in indiscriminate order upon a section of the screws 11 and 12 designated by the numeral 73. The pitch of the spiral ways 13 in the section 73 is such that properly positioned screw blanks may be advanced in close proximity with one another until a section of the screws denoted by the numeral 74 is reached. In this section the pitch of the spiral ways is increased to quickly advance individual screws over recessed portions of the screws 11 and 12 to permit of the downward displacement of improperly positioned screw blanks onto the chute 72. From the section 74 the screws are advanced to a section 75 where properly positioned blanks are stored and successively fed therefrom in proper predetermined spaced relation by the ways in a section 76 of the screw 12.

In order to prevent the continuous advancement of properly positioned screw blanks within the section 74 after the storage section 75 has been completely filled, a stop mechanism 78 is provided (Fig. 4) which includes a pivoted finger 79 having a depending tip 80 which is adapted to be moved downwardly so as to obstruct the continued advancement of blanks. The downward movement of the depending tip 80 is occasioned through the actuation of a pivoted guard member 82 which is adapted to be raised upwardly as a result of the backing up of screw blanks when the section 75 has been completely filled. A fixed guard member 83 rests immediately above the heads of properly positioned screw blanks as clearly shown in Fig. 3 and thereby prevents the dislodgment thereof from their proper positions within the spiral way.

From the foregoing it will be clear that the screw blanks may be indiscriminately deposited upon the section 73 of the screw mechanism 10 and blanks properly positioned within the ways 13 will be advanced to the lower extremity of the screw 12 at which point the transfer mechanism 32 operates to positively feed individual blanks at predetermined intervals into position between the dies 44 and 53.

The described apparatus presents a very compact device which is capable of greatly accelerating the production of threads in screw blanks in continuous succession.

What is claimed is:

1. In apparatus for working blanks, a blank working means, a reciprocable means for feeding individual blanks to the working means at predetermined intervals, and a screw mechanism operable in timed relation with the feeding means and having a spiral way for advancing associated blanks in a predetermined spaced relation to feed individual blanks directly to the reciprocable feeding means.

2. In apparatus for threading blanks, a blank threading mechanism including a rotary die, means for successively feeding blanks to the threading mechanism at predetermined intervals, and a screw mechanism operable in timed relation with the feeding means and having a spiral way for advancing blanks in a predetermined spaced relation to deliver individual blanks to the feeding means.

3. In apparatus for threading blanks, a blank threading mechanism, means for successively feeding blanks thereto, and a screw mechanism having a spiral way for advancing blanks from a supply thereof, storing properly positioned blanks, and advancing the stored blanks in a predetermined spaced relation to successively present individual blanks to the feeding means at proper predetermined intervals.

4. In apparatus for threading screw blanks, a movable threading die, a reciprocable member for feeding individual screw blanks to the threading die, a screw mechanism having a spiral way for advancing screw blanks in spaced relation to feed blanks to the reciprocable member at predetermined intervals, and means operatively connecting the reciprocable member with the screw mechanism.

5. In apparatus for threading screw blanks, a movable threading die, a reciprocable member for feeding individual screw blanks to the movable threading die, a screw mechanism provided with a cam surface and having a spiral way for advancing screw blanks in spaced relation to feed blanks to the reciprocable member at predetermined intervals, a pivoted member connected with the reciprocable member, and a follower carried by the pivoted member and operatively associated with the cam surface on the screw mechanism.

6. In apparatus for threading screw blanks, a threading mechanism including a rotary die and a fixed die companion thereto, a reciprocable member for successively feeding individual blanks between the rotary and fixed dies, a screw mechanism operable in desponse to the movement of the rotary die provided with a cam surface and having a spiral way for advancing screw blanks in spaced relation from a supply thereof to feed individual blanks directly to the reciprocable member at predetermined intervals, and means cooperating with the cam surface to actuate the reciprocable member during each revolution of the screw mechanism.

7. In a material working apparatus, a pair of relatively rotatable cooperating dies designed to operate upon a blank positioned therebetween and to advance the blank from a receiving station to a discharge station, a moving conveyor adapted to deliver a blank to a point adjacent the receiving station at predetermined intervals, and a reciprocating member operable in synchronism with the movement of the conveyor to move the blank from said point into position between the dies.

8. In apparatus for threading screw blanks, a rotary threading die, a stationary die cooperating with the rotary die to form threads on the blanks and to advance the blanks from a receiving station to a discharge station, a rotary spiral conveyor adapted to deliver a blank to a point adjacent the receiving station at predetermined intervals, and a reciprocating member controlled by the rotation of the conveyor and having a beveled surface adapted to move the blanks from said point into position between the dies.

In witness whereof, I hereunto subscribe my name this 28th day of May, A. D. 1927.

JAMES MILTON COOK.